UNITED STATES PATENT OFFICE.

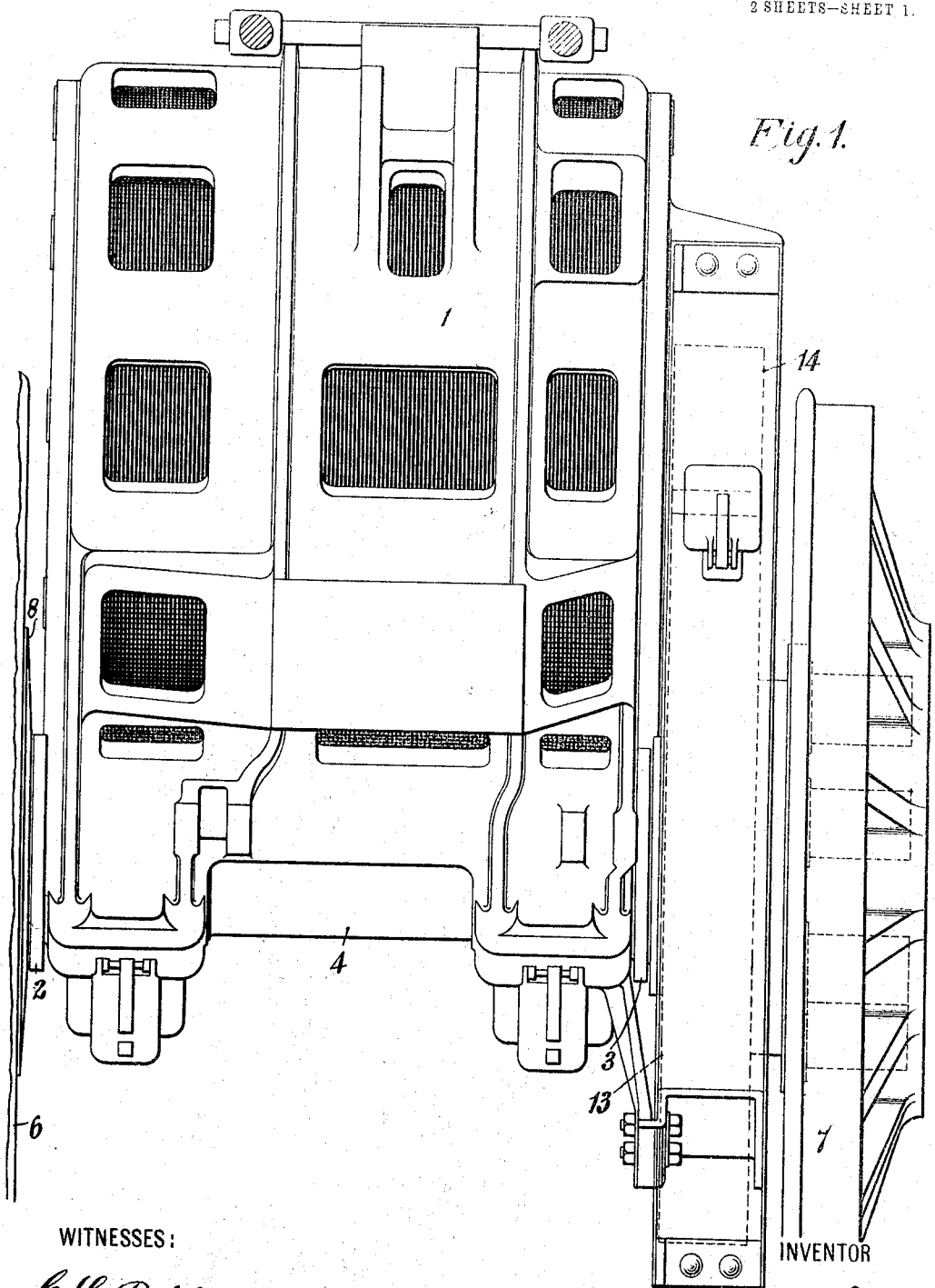

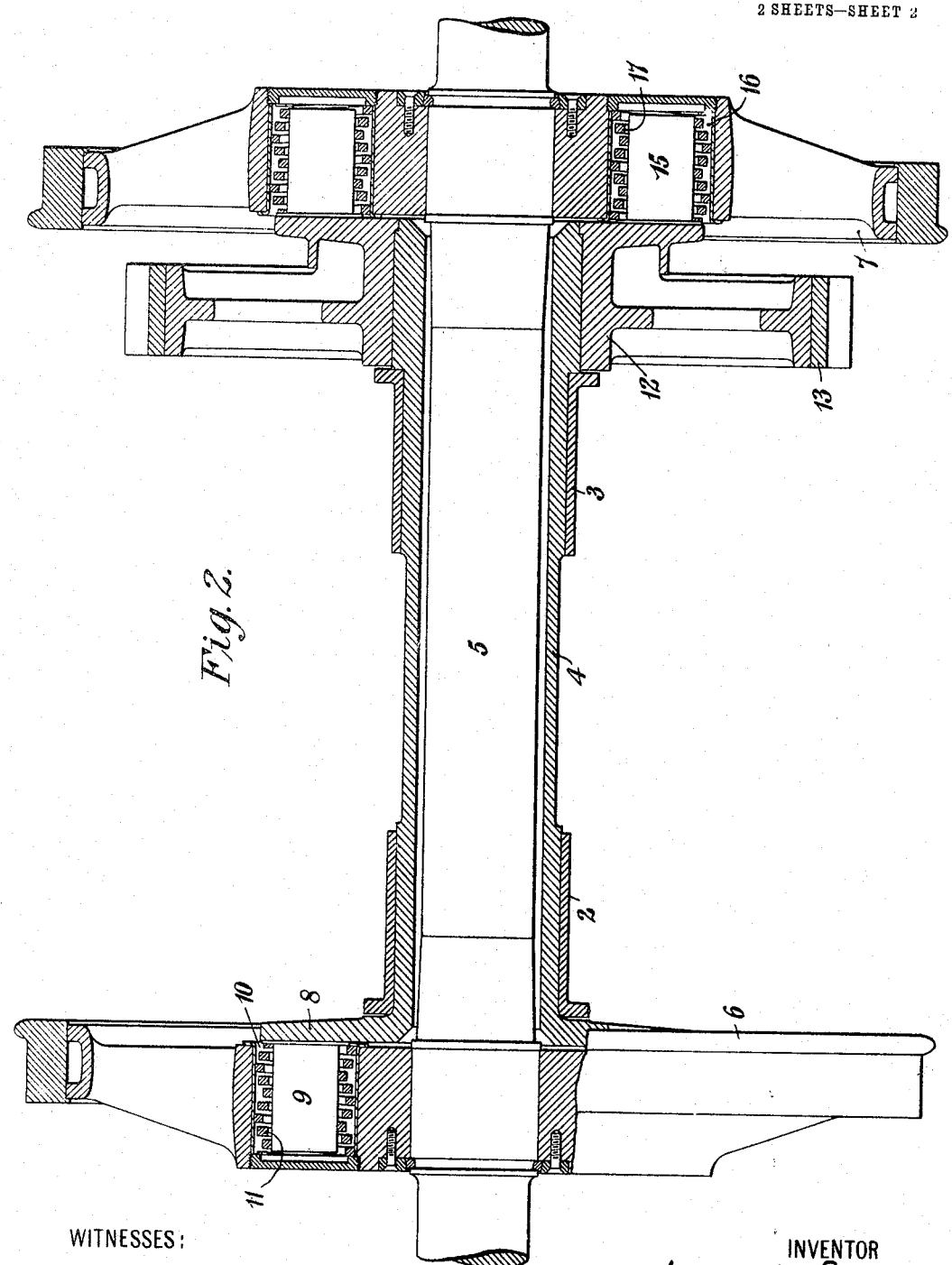

NORMAN W. STORER, OF PITTSBURG, PENNSYLVANIA, ASSIGNOR TO WESTINGHOUSE ELECTRIC & MANUFACTURING COMPANY, A CORPORATION OF PENNSYLVANIA.

RESILIENT GEAR CONNECTION.

No. 894,915.  Specification of Letters Patent.  Patented Aug. 4, 1908.

Application filed December 3, 1906. Serial No. 346,081.

*To all whom it may concern:*

Be it known that I, NORMAN W. STORER, a citizen of the United States, and a resident of Pittsburg, in the county of Allegheny and State of Pennsylvania, have invented a new and useful Improvement in Resilient Gear Connections, of which the following is a specification.

My invention relates to resilient connections between electric motors or other prime movers and the parts driven thereby, and it has for its object to provide a connection possessing such structural characteristics that it may be more readily and economically manufactured than others heretofore employed.

When very large and heavy motors are employed for the propulsion of vehicles it is frequently desirable that they be resiliently mounted and resiliently connected to the parts driven thereby. To this end, the motors are sometimes supported at one side, by means of bearings, upon a quill that loosely surrounds the driving axle and is resiliently connected thereto or to the driving wheels, the quill being driven by the motor through gear connections. A suitable resilient connection between the quill and the driving wheel is set forth in Patent No. 816,611, granted to the Westinghouse Electric & Manufacturing Company as assignee of Robert Siegfried, in which the quill is provided with radial arms or an annular flange from which bosses project into corresponding chambers in the driving wheel, the bosses being surrounded within the chambers by resilient cushioning means. When such means are provided at both ends of the quill, it has been found extremely difficult to cast the same with radial arms or flanges and the gear blank or spider in one piece. For that reason, I propose to provide a quill with radial arms or flanges at one end only and to mount upon the other end a gear wheel or a gear spider having projections that extend into corresponding chambers in the adjacent wheel, thus providing a simple two-part structure that may be economically and easily constructed.

Figure 1, of the accompanying drawings, is a plan view of a motor and a mounting therefor that embody my invention, and Fig. 2 is a partial sectional view on the line II—II of Fig. 1.

A motor 1 is supported at one side, by means of bearings 2 and 3, upon a quill 4 that loosely surrounds an axle 5 near the extremities of which, driving wheels 6 and 7 are mounted. The quill 4 is provided with radial arms or an annular flange 8, as may be preferred, from which bosses 9 project into corresponding chambers 10 in the wheel 6, each boss being surrounded, within the chamber by any suitable resilient cushioning means such, for example, as a specially formed spring 11 that constitutes the subject-matter of Patent No. 817,133, granted to the Westinghouse Electric & Manufacturing Company as assignee of Robert Siegfried.

Mounted upon the opposite end of the quill 4 is a gear wheel which, in the present instance, comprises a spider 12 and a rim 13 in which the teeth are formed, but which may also be constructed in one piece, if desired, the gear wheel meshing with a pinion 14 that is operated by the motor 1. The spider 12 of the gear wheel is provided, upon its outer face, with bosses 15 that project into chambers 16 in the driving wheel 7 and are surrounded within the chambers by springs 17, this portion of the structure being substantially like that comprising the parts 6, 7, 8, 9, 10, and 11.

It will be readily seen from an inspection of the drawings that, if both ends of the quill were provided with radial arms or annular flanges, it would be extremely difficult to cast the quill with radial arms or flanges at both ends and the gear wheel in one piece. It is also seen that the present invention provides a two-part structure for the quill and the gear that may be readily and economically manufactured.

I claim as my invention:

1. The combination with an axle, wheels mounted thereon, and a quill loosely surrounding the axle between the wheels and having resilient connection at one end to the adjacent wheel, of a gear wheel mounted upon and fastened to the quill and having resilient connection to the other axle wheel.

2. The combination with an axle, wheels mounted thereon having chambers, and a quill loosely surrounding the axle between the wheels and having bosses at one end that project into the chambers in the adjacent wheel, of a gear wheel mounted upon and fastened to the quill and having lateral bosses that project into the chambers in the other axle wheel.

3. The combination with an axle, wheels mounted thereon having chambers, and a quill loosely surrounding the axle between the wheels and having bosses at one end that project into the chambers in the adjacent wheel, of a gear wheel mounted upon and fastened to the quill and having lateral bosses that project into the chambers in the other axle wheel, a motor supported upon the quill, and a pinion operated by said motor and meshing with the gear wheel.

4. The combination with an axle, wheels mounted thereon, and a quill loosely surrounding the axle between the wheels and resiliently connected to one of them, of a one-piece gear wheel mounted upon and fastened to said quill and resiliently connected to an axle wheel.

In testimony whereof, I have hereunto subscribed my name this 28th day of November, 1906.

NORMAN W. STORER.

Witnesses:
F. E. WYNNE,
BIRNEY HINES.